(12) United States Patent
Moriyama et al.

(10) Patent No.: US 11,145,066 B2
(45) Date of Patent: Oct. 12, 2021

(54) PARCEL RECOGNITION DEVICE, PARCEL SORTING SYSTEM, AND PARCEL RECOGNITION METHOD

(71) Applicant: PANASONIC INTELLECTUAL PROPERTY MANAGEMENT CO., LTD., Osaka (JP)

(72) Inventors: Takaaki Moriyama, Kanagawa (JP); Takaaki Idera, Kanagawa (JP); Shohji Ohtsubo, Kanagawa (JP); Pongsak Lasang, Singapore (SG); Takrit Tanasnitikul, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 16/623,667

(22) PCT Filed: May 16, 2018

(86) PCT No.: PCT/JP2018/018943
§ 371 (c)(1),
(2) Date: Dec. 17, 2019

(87) PCT Pub. No.: WO2019/003686
PCT Pub. Date: Jan. 3, 2019

(65) Prior Publication Data
US 2020/0193612 A1   Jun. 18, 2020

(30) Foreign Application Priority Data

Jun. 30, 2017   (JP) .............................. JP2017-129574

(51) Int. Cl.
*G06T 7/90*   (2017.01)
*G06T 7/194*   (2017.01)
(Continued)

(52) U.S. Cl.
CPC ............ *G06T 7/194* (2017.01); *G06K 7/1413* (2013.01); *G06Q 10/083* (2013.01);
(Continued)

(58) Field of Classification Search
CPC ............ G06T 7/90; G06T 7/70; G06K 7/1413
See application file for complete search history.

(56) References Cited

U.S. PATENT DOCUMENTS

| 5,737,438 A | 4/1998 | Zlotnick et al. |
| 6,047,889 A * | 4/2000 | Williams ................. B07C 3/14 235/383 |

(Continued)

FOREIGN PATENT DOCUMENTS

| EP | 1148316 | * 10/2001 | ............... G06T 7/00 |
| EP | 1148316 A1 | 10/2001 | |

(Continued)

OTHER PUBLICATIONS

The Extended European Search Report dated Oct. 12, 2020 for the related European Patent Application No. 18822731.8.
(Continued)

*Primary Examiner* — Myron Wyche
(74) *Attorney, Agent, or Firm* — Greenblum & Bernstein, P.L.C.

(57) ABSTRACT

There is provided a parcel recognition device that recognizes parcel based on a color image including one or more parcels, the device including: a processor; and a memory, in which by cooperating with the memory, the processor estimates a region of the one or more parcels in the color image, switches a color of a background which is a region excluding the region of the one or more parcels in the color image, and recognizes each of the one or more parcels based on the background having the switched color and a color of the region of the parcel.

11 Claims, 7 Drawing Sheets

(51) Int. Cl.
*G06T 7/70* (2017.01)
*G06K 7/14* (2006.01)
*G06Q 10/08* (2012.01)

(52) U.S. Cl.
CPC ............ *G06Q 10/087* (2013.01); *G06T 7/70* (2017.01); *G06T 7/90* (2017.01); *G06T 2207/10024* (2013.01)

(56) References Cited

U.S. PATENT DOCUMENTS

| | | |
|---|---|---|
| 7,090,134 B2 | 8/2006 | Ramsager |
| 2003/0026479 A1 | 2/2003 | Thomas et al. |
| 2009/0002517 A1 | 1/2009 | Yokomitsu et al. |
| 2011/0267491 A1 | 11/2011 | Yokomitsu et al. |
| 2017/0066597 A1 | 3/2017 | Hiroi |

FOREIGN PATENT DOCUMENTS

| | | | |
|---|---|---|---|
| JP | 2011100244 | * 5/2011 | ............ G06F 17/30 |
| WO | 95/24278 A1 | 9/1995 | |
| WO | 2007/080834 | 7/2007 | |
| WO | 2011/115666 A2 | 9/2011 | |
| WO | 2015/145982 | 10/2015 | |

OTHER PUBLICATIONS

Partial European Search Report (R.164 EPC) dated May 27, 2020 for European Patent Application No. 18822731.8.

\* cited by examiner

PARCEL RECOGNITION DEVICE, PARCEL SORTING SYSTEM, AND PARCEL RECOGNITION METHOD

TECHNICAL FIELD

The present disclosure is related to a parcel recognition device, a parcel sorting system, and a parcel recognition method useful to sort parcel.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Technical Problem

However, in recent years, the amount of parcel circulation has been increased more and more and types of parcel have also become various, so that a technology of effectively and precisely sorting the parcel is required.

The present disclosure is related to the technology of effectively and precisely sorting the parcel.

Solutions to Problem

According to the present disclosure, there is provided a parcel recognition device that recognizes parcel based on a color image including one or more parcels, the device including: a processor; and a memory, in which by cooperating with the memory, the processor estimates a region of the one or more parcels in the color image, switches a color of a background which is a region excluding the region of the one or more parcels in the color image, and recognizes each of the one or more parcels based on the background having the switched color and a color of the region of the parcel.

According to the present disclosure, there is provided a parcel sorting system including: a projection instruction device including the parcel recognition device described above; a label reader that reads parcel identification information from a label attached to the parcel; a distance image sensor that obtains a distance image including the parcel; a color image sensor that obtains a color image including the parcel; and an image projection device which projects a projection image indicating a sorting destination on parcel.

According to the present disclosure, there is provided a parcel recognition method of recognizing parcel based on a color image including one or more parcels, the method including: by causing a processor to cooperate with a memory, estimating a region of the one or more parcels in the color image; switching a color of a background which is a region excluding the region of the one or more parcels in the color image; and recognizing each of the one or more parcels based on the background having the switched color and a color of the region of the parcel.

According to the present disclosure, it is possible to more effectively and precisely sort parcel and to further deal with an increase in the amount of parcel circulation. Specifically, it is possible to recognize parcel even in a case where a color of the parcel is similar to or the same as a color of a belt of a transport conveyor, and it is possible to prevent tracking accuracy of the parcel from deteriorating.

DESCRIPTION OF EMBODIMENTS

Hereinafter, embodiments (hereinafter, referred to as "present embodiment") which specifically disclose a parcel recognition device, a parcel sorting system, and a parcel recognition method according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 7.

[Configuration]

Figure 1:
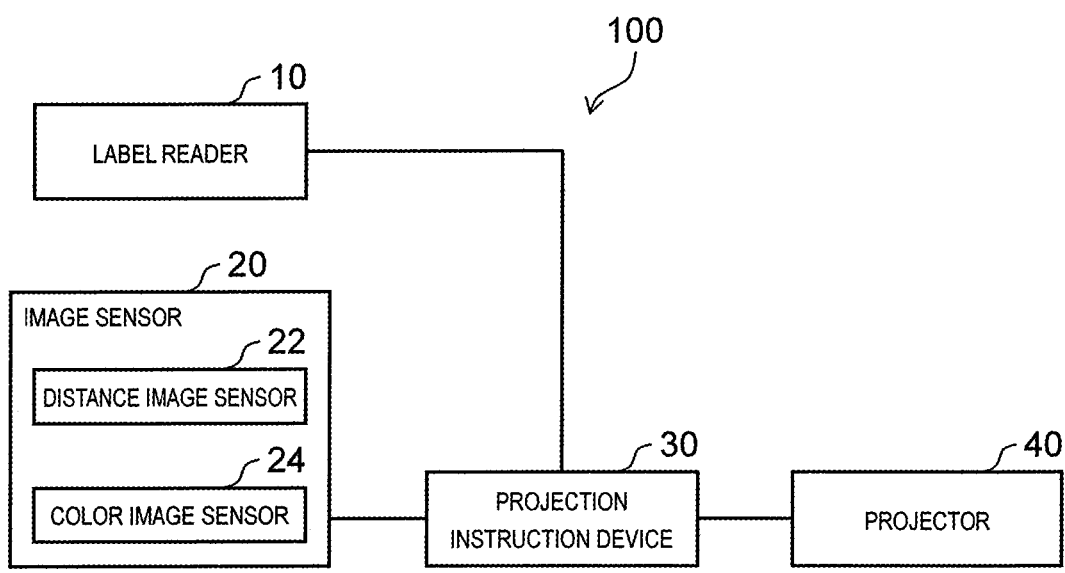
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection instruction device 30, and projector 40. Parcel sorting system 100 is a system which supports work of a worker who sorts parcel transported by a transport conveyor. Parcel sorting system 100 is installed at the distribution center owned by, for example, a retailer, a wholesaler, an internet distributor, or the like. Parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection instruction devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information including various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images parcel generated by the distance image and generates a color image. "Color image" refers to an image in which a color of a surface of parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
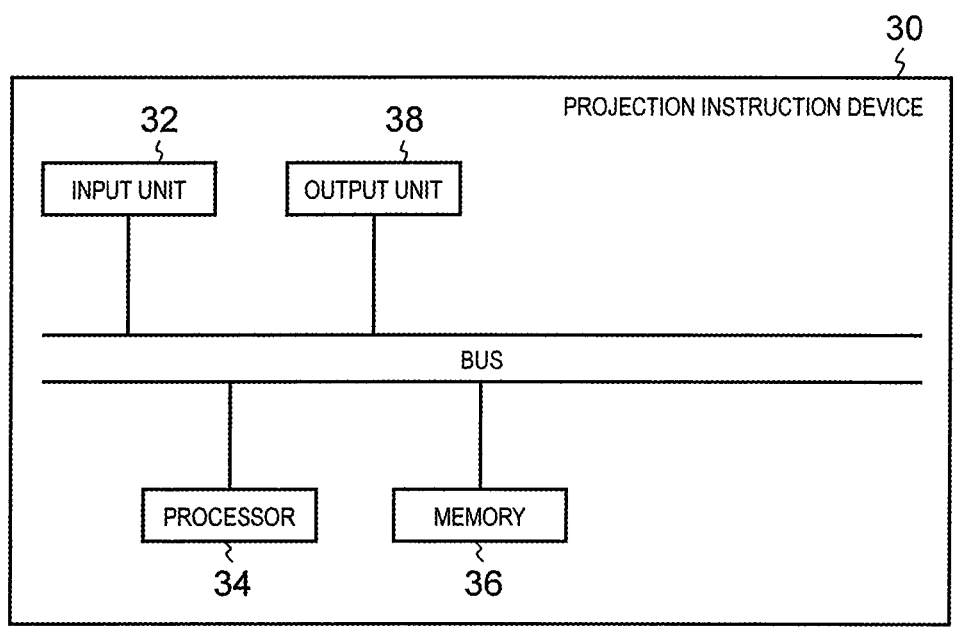
FIG. 2 is a block diagram illustrating a configuration of a projection instruction device according to the embodiment.

Projection instruction device 30 functions as a calculation device in parcel sorting system 100. As illustrated in FIG. 2, projection instruction device 30 includes input unit 32, processor 34, memory 36, and output unit 38 connected with one another via a bus. Input unit 32 receives parcel identification information for specifying parcel obtained from the label recording information read by label reader 10, a distance image generated by distance image sensor 22, and a color image generated by color image sensor 24. Processor 34 is configured by a general calculation device and generates a projection image to be projected on parcel based on the parcel identification information, the distance image, and the color image. Memory 36 as a storage device reads a control program necessary for various processes by processor 34 and performs an operation such as data backup. That is, processor 34 and memory 36 control various processes by projection instruction device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection instruction device 30, on the parcel and displays the projection image onto the parcel.

Parcel sorting system 100 can be configured to include label reader 10, image sensor 20 (distance image sensor 22 and color image sensor 24), projection instruction device 30, and projector 40 connected with one another in wired communication or in wireless communication. In addition, parcel sorting system 100 also can be configured to include two or more devices of any of label reader 10, image sensor 20, projection instruction device 30, and projector 40 as an integral device. For example, image sensor 20 and projector 40 can be combined to construct an integral imaging projection device (see FIG. 3A).

[Outline of System]

Figure 3A:
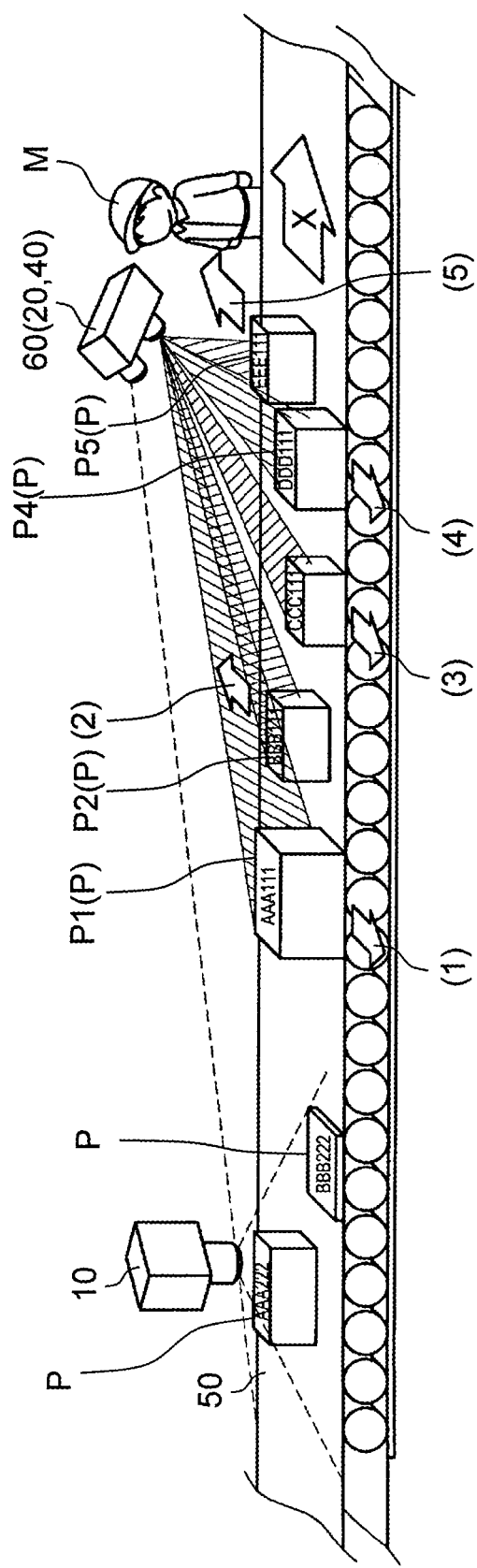
FIG. 3A is a conceptual diagram illustrating a status in which the parcel sorting system is installed in a distribution center and is in operation.

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and place the parcel once in the vicinity such as the worker's own feet, a basket, a truck bed. However, in a case of visually sorting by the worker, there is a limit in work efficiency of the worker, so that it is necessary to limit a transport speed to a predetermined value or less. As a result, a limit value of the amount of parcel, which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as an integrated imaging projection device 60 and are disposed above transport conveyor 50.

Projection instruction device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection instruction device 30 transmits a projection instruction to project the projection image on parcel P, to projector 40.

Figure 3B:
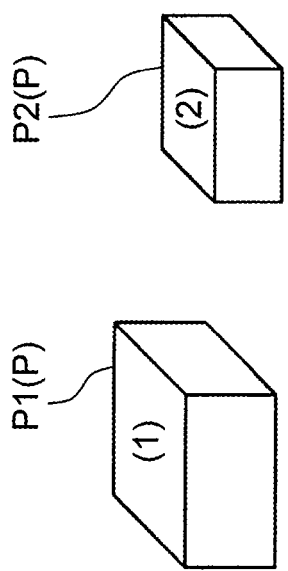
FIG. 3B is a diagram illustrating a state in which a projection image including a number is projected on an upper surface of parcel.
Figure 4:
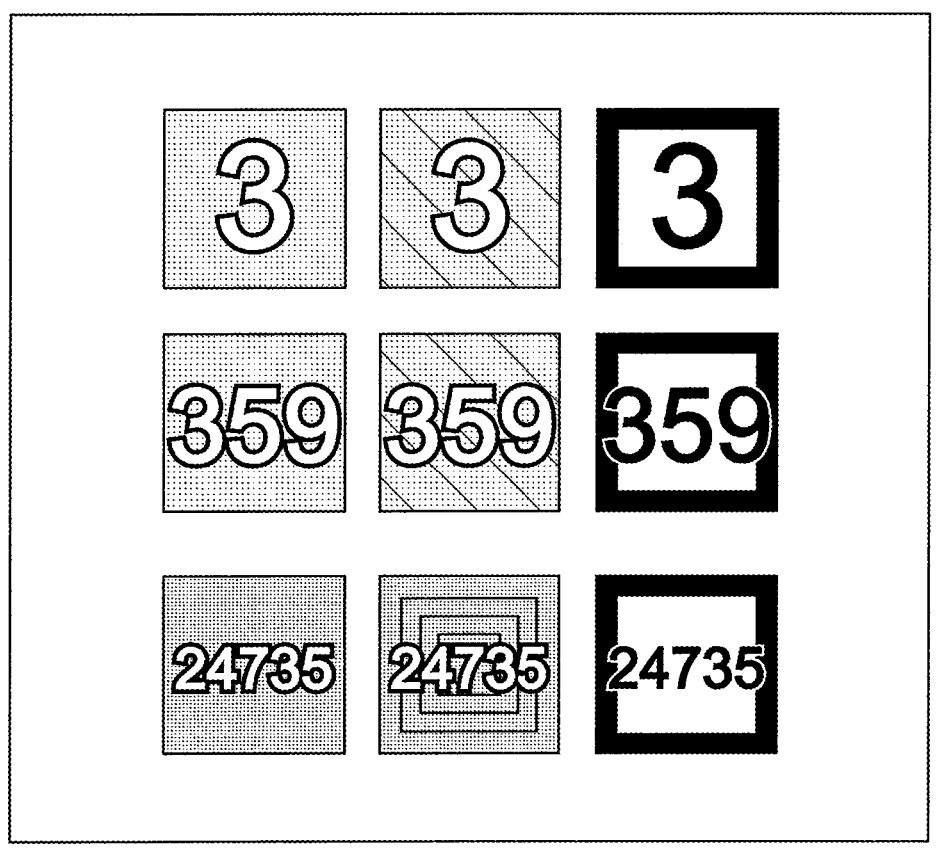
FIG. 4 is a diagram illustrating an example of a projection image generated by the projection instruction device according to the embodiment.

Projector 40 which receives the projection instruction, as an image projection device, projects projection light including the projection image generated by projection instruction device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of the transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, a moving light ray or light spot in the sorting direction, forming all or a part of the projection image in the sorting direction, changing the color of the projection image in the sorting direction, and displaying an arrow moving in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection instruction device 30 will be described.

[Outline of Operation]

Figure 5:
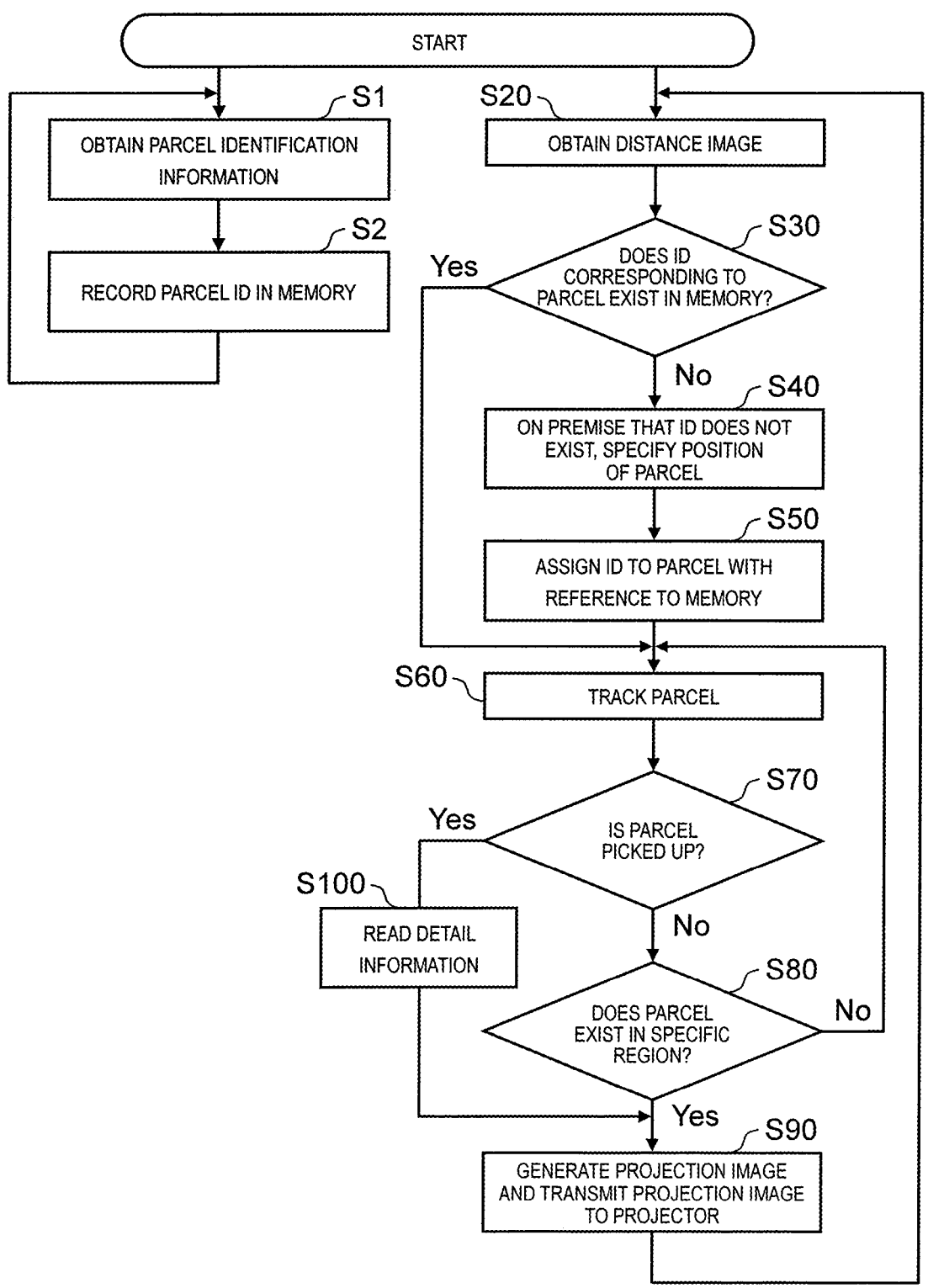
FIG. 5 is a flowchart illustrating an outline procedure of an operation mainly performed by the projection instruction device.

FIG. 5 is a flowchart illustrating an outline procedure of an operation of mainly performed by projection instruction device 30 of the present embodiment, particularly processor 34 of projection instruction device 30. First, after label reader 10 reads the label recording information of the label of the parcel, input unit 32 of projection instruction device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2).

The ID recorded in memory 36 may be the parcel identification number originally recorded in the parcel identification information or may be assigned by projection instruction device 30 generating a new ID.

On the other hand, in parallel with step S1 and step S2, after distance image sensor 22 of image sensor 20 images the distance image of the parcel, input unit 32 of projection instruction device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, when processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined region in which parcel is to be picked up) described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection instruction device 30, projects the projection image on the corresponding parcel.

The above is the outline of the operation procedure performed by processor 34 and the like of projection instruction device 30. Of course, the operation procedure is not limited to that described above. For example, the determination in step S70 can be omitted. In addition, for the determination in step S70, it is possible to use contact determination between a hand of the worker and the parcel, a color image, a distance image, or the like. Hereinafter, further detailed procedures of each process will be described.

[Switching of Background Color Used for Recognizing Parcel]

In a case of recognizing and following parcel by using a color image of the parcel to which a distance image has been obtained, it is possible to narrow down a recognition region of the parcel and to improve a recognition rate, by using a speed at which the parcel is transported and predicting a position in the next frame. Meanwhile, even if the recognition region in which the parcel is to be recognized is narrowed down, in a case where a background color is similar to or the same as a color of the parcel to be recognized, there is a high possibility that a shape of the parcel to be recognized is wrong, or that the parcel is not recognized when the parcel is moved in an unexpected direction. That is, there is a high possibility that tracking accuracy of the parcel deteriorates. In the parcel sorting system, in a case where a background color is mainly a color of a belt of transport conveyor 50 and a color of the parcel is similar to or the same as this color, it may be difficult to recognize the parcel, and may not track the parcel.

In the present disclosure, in step S60 in FIG. 5, by switching the background color, which is a region excluding the parcel, in a color image, the parcel can be reliably recognized and the parcel can be tracked.

That is, processor 34 detects parcel from the distance image of the parcel included in sensing information with performing a masking process on the image, and then obtains a background region excluding the parcel in the color image of the parcel included in the sensing information to switch the background colors. By switching the background color, which is a region excluding the parcel, in the color image, the parcel can be recognized even if the color of the parcel is similar or the same as the color of the belt of transport conveyor 50. Even if the background color is other than the color of the belt of transport conveyor 50, in a case where parcel having a color similar or the same as the background color is transported, it is difficult to recognize the parcel. By preparing a plurality of types of the background color and switching between them, it is possible to recognize the parcel. Switching between the plurality of background colors is performed for each predetermined period including, for example, each frame. In this manner, by setting a background color to a plurality of colors different from a color of parcel and switching the colors, it is possible to reliably recognize the parcel and to keep tracking accuracy high.

Figure 6:
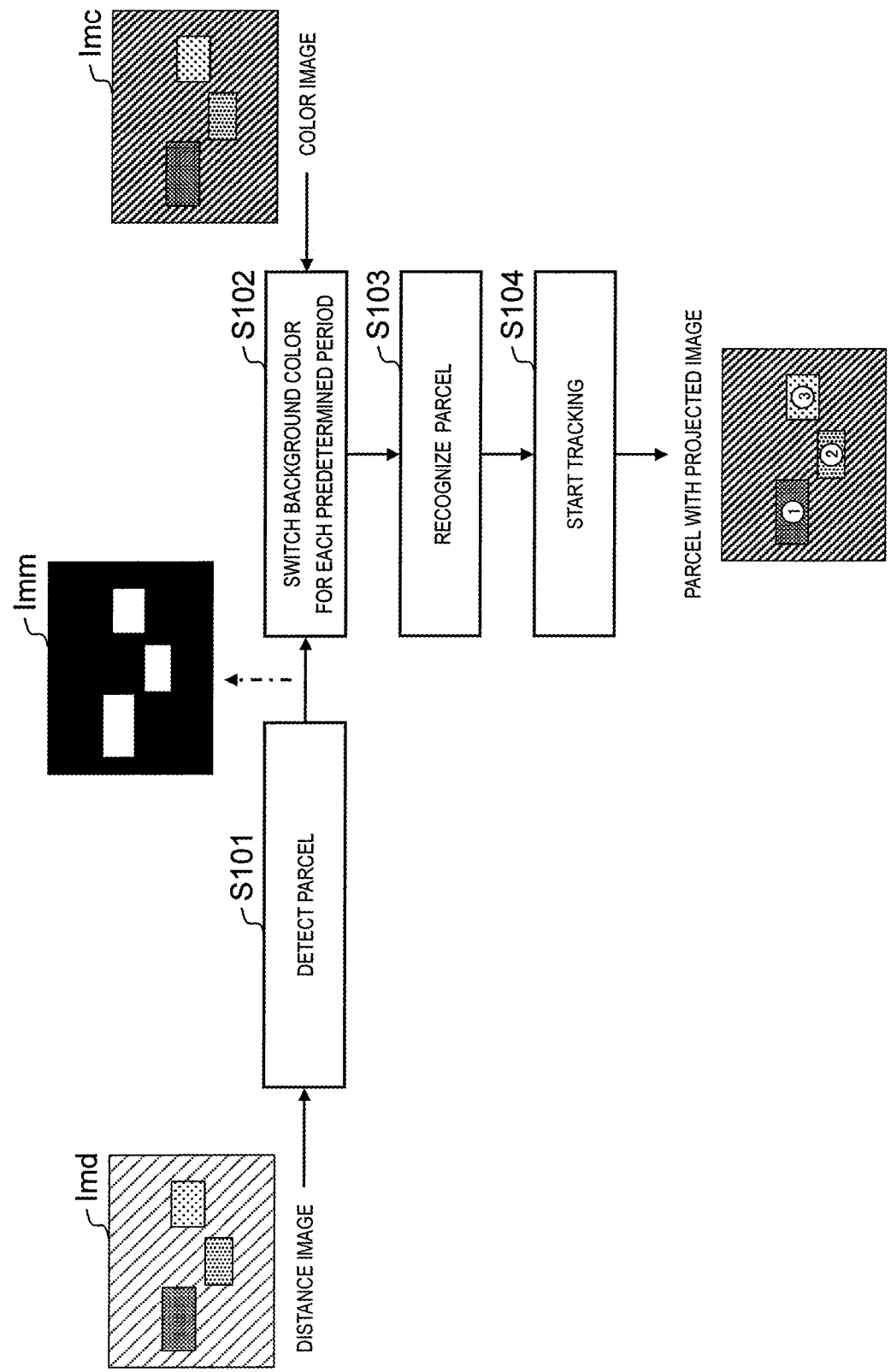
FIG. 6 is a flowchart illustrating a process of recognizing and tracking parcel.

FIG. 6 is an example of a flow corresponding to the process described above. The flow illustrated here indicates the detailed process in step S60 in the flowchart of the outline procedure in FIG. 5. That is, processor 34 detects parcel by a distance image of the parcel included in sensing information and further cuts a region of the detected parcel away from the distance image (step S101). In this case, since the distance image includes not only one piece of parcel but also a plurality of parcels, for example, as illustrated in FIG. 6, if three parcels are included in distance image Imd, all parcels are detected and each of regions is cut away. By cutting the regions of all parcels in distance image Imd away, mask image Imm for extracting a background region in a color image is obtained. Here, in order to precisely extract the background region in the color image, a positional relationship between the distance image and the color image needs to be known in advance. The positional relationship between the distance image and the color image can be recognized by extracting a parameter indicating a correspondence of a coordinate system of the distance image and the color image by an image process and generating a transformation matrix, for example.

After detecting parcel by a distance image and generating mask image Imm obtained by cutting a region of the detected parcel, processor 34 uses mask image Imm so as to obtain a background excluding the parcel in color image Imc of the parcel included in sensing information. The obtained background color is switched for each predetermined period (step S102). The background color is switched for each frame described above, for example. Further, a background color to be switched is selected from a color different from a color of the currently recognized parcel. For example, among candidates of the background color, a candidate having a large difference in pixel value between a color of the parcel and the candidate of the background color is selected.

Figure 7:
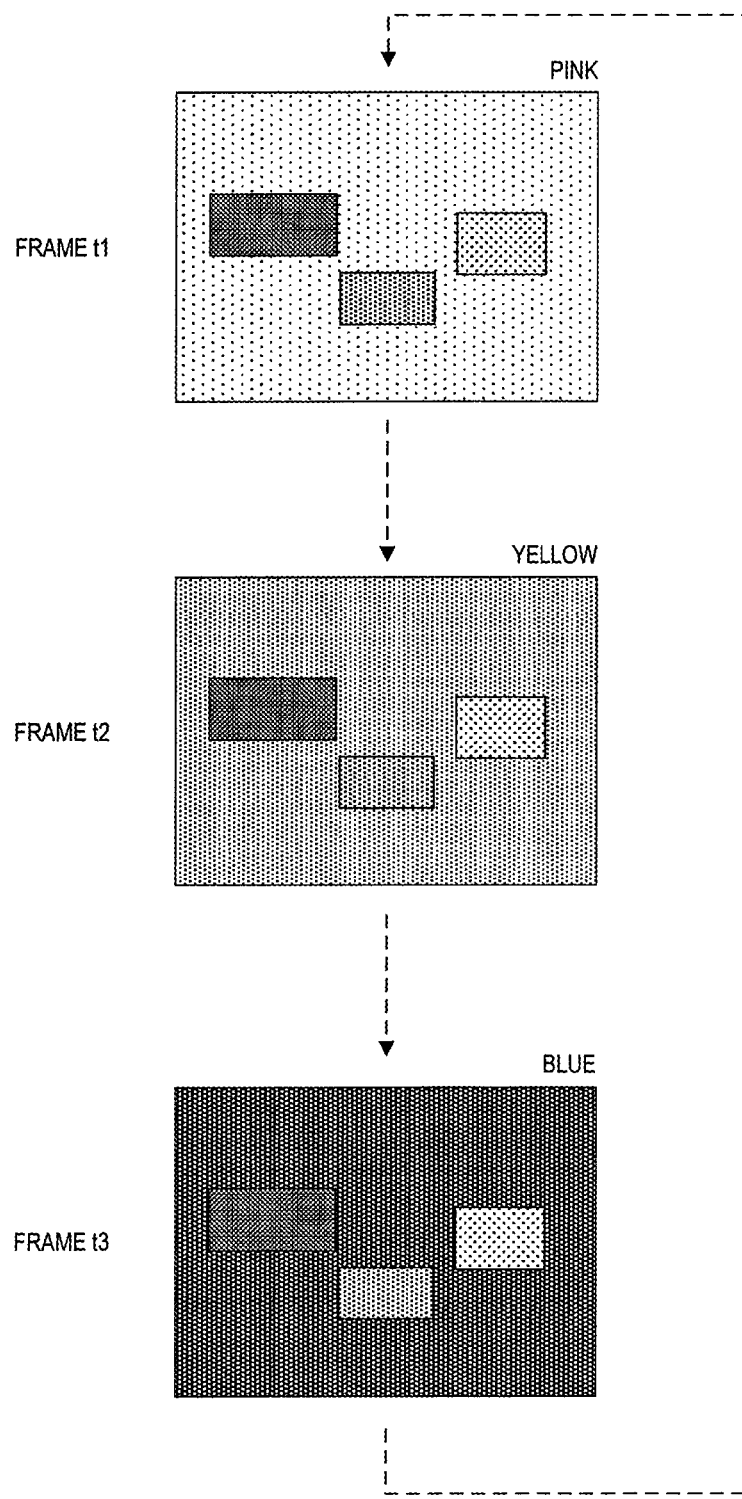
FIG. 7 is a diagram illustrating an example in which switching of a background color is performed for each frame.

FIG. 7 is a diagram illustrating an example in which switching of a background color is performed for each frame. As illustrated in FIG. 7, three colors of pink, yellow, and blue are prepared as background colors, and these colors are switched for each frame. In FIG. 7, a difference between pink, yellow and blue is represented by a density of dots. That is, pink is the coarsest, blue is the finest, and yellow is between them. A background color is switched to pink at frame t1, switched to yellow at frame t2, and switched to blue at frame t3. After then, switching is executed in the same manner. As described above, when switching a background color, a color different from a color of parcel is selected. For example, when the color of the parcel is yellow, yellow is excluded from candidates of the background color, and the color is switched between pink and blue.

Processor 34 recognizes the parcel by switching the background color for each frame (step S103). In this case, when there are a plurality of parcels, all pieces are recognized. Processor 34 starts tracking the recognized parcel (step S104). As described above, processor 34 generates a projection image for the recognized parcel, and output unit 38 outputs the generated projection image to projector 40. For example, red encircled number 1, green encircled number 2, or blue encircled number 3 is projected on each parcel.

As described above, according to the present disclosure, when recognizing parcel based on a color image, by setting a background color to a plurality of colors different from a color of the parcel and switching the colors, it is possible to reliably recognize the parcel and to accurately track the parcel, as a result.

When recognizing parcel based on a distance image, a position of the parcel can be estimated, but it may be difficult to individually track the parcel when a plurality of parcels are adjacent to each other. Therefore, in the present disclosure, by estimating a region of the parcel in a color image by using the distance image and tracking each parcel by the color image, tracking accuracy for the parcel is improved. Meanwhile, since there is a possibility of a recognition mistake when a background color and a color of parcel are similar even in a case of tracking each parcel by the color image, in the present disclosure, by switching background colors, the possibility that such a mistake occurs is reduced.

Although the embodiment of a parcel recognition device, a parcel sorting system, and a parcel recognition method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

As modification examples, for example, the following or the like can be considered.

In the embodiment described above, the background color is switched between three colors of pink, yellow, and blue for each frame, but the embodiment is not limited thereto. The background color may be another color prepared in advance, or may be generated as needed for each frame. For example, as long as a color of parcel is different from a color of a belt of transport conveyor 50, the color of the belt of transport conveyor 50 may be added to candidates of the background color. Further, in a case of performing generation for each frame, for example, it is conceivable to define RGB values which define the background color by a function using a frame number. For example, if each RGB has 256 gradations, a value obtained by adding a remainder obtained by dividing the frame number by 256 to a predetermined initial value may be used. Further, if the initial value or the value obtained by dividing the frame number is set at random, the background color can be set more variously, and tracking accuracy can be maintained.

In the embodiment described above, the background color is switched for each frame, but the embodiment is not limited thereto. Switching may be performed every two or more predetermined frames, or a cycle itself of the switching may be variable. In a case where the cycle is variable, for example, a cycle may be shortened if a frequency of a tracking mistake of parcel increases. In addition, in a case where there are few tracking mistakes of the parcel, the background color may not be switched. Although it is possible to maintain tracking accuracy of parcel on average by switching a background color, in a case where the background color to be switched itself is similar to a color of the parcel, the tracking accuracy of the parcel may be maintained without switching rather than switching the background color. In this case, it is desirable to use a background color in which tracking is successfully performed for as long as possible. The tracking accuracy can be evaluated by, for example, determining whether or not the parcel detected in the past frame is increased or decreased in the current frame. Meanwhile, since the number of parcels is also increased or decreased by pick-up of a worker or installation on transport conveyor 50, increase or decrease of one piece of parcel can occur even when there is no tracking mistake. Therefore, when the tracking accuracy is determined by the number of parcels, it is desirable to have a predetermined threshold value (at least two or more increase or decrease).

In the embodiment described above, a user may be able to set candidates of a background color. In this case, as a content to be set, a color itself may be designated, or a range of the color may be designated. For example, assuming that parcel is a general cardboard box, a possibility that brown parcel is transported is very high, but a possibility that red or green parcel is transported is low. Therefore, by performing a setting so as to avoid a color similar to a brown color as a candidate of a background color, or by setting red or green, it is possible to reduce a possibility that a color with low recognition accuracy is set as the background color.

In the embodiment described above, candidates of a background color may be set in consideration of a color of parcel. For example, by setting candidates of a background color so as to avoid a color of parcel successfully tracked in the previous frame, it is possible to reduce a possibility of missing the parcel successfully tracked. It is possible to realize selection of the candidates of the background color by, for example, evaluating RGB values of parcel being tracked. For example, regarding each RGB value, by extracting the closest value between parcels being tracked and by setting a median value of the value as a background color, it is possible to set a color far from a color of any as the background color.

In the embodiment described above, a distance image is used to obtain information indicating a position of parcel, a distance to the parcel, a size of the parcel, and the like, but the present embodiment is not limited thereto. In the embodiment described above, since a background color is set so as to precisely perform tracking by a color image after the position, the distance, the size of the parcel, and the like are roughly estimated, any means can be used at a stage of rough estimation. For example, by using a two-dimensional bar-code attached to parcel, it is possible to recognize the position, the distance, the size, and the like of the parcel without using a distance image.

INDUSTRIAL APPLICABILITY

The present disclosure is useful to provide a parcel recognition device, a parcel sorting system, and a parcel recognition method capable of reliably recognizing parcel even if a color of the parcel is similar to or the same as a color of a transport conveyor.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INSTRUCTION DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:

1. A parcel recognition device that recognizes parcel based on a color image including one or more parcels on a conveyor, the device comprising:
a processor; and
a memory,
wherein by cooperating with the memory,
the processor estimates a region of the one or more parcels in the color image,
switches a color of a background in the color image, the background being which is a region including a region of the conveyor in the color image and excluding the estimated region of the one or more parcels in the color image, and
recognizes each of the one or more parcels based on the color image after the color of the background is switched.

2. The parcel recognition device of claim 1,
wherein the processor switches the color of the background for each predetermined period.

3. The parcel recognition device of claim 2,
wherein the processor changes a period for switching the color of the background, according to recognition accuracy of the parcel.

4. The parcel recognition device of claim 1,
wherein the processor sets a color different from a color of parcel successfully recognized in a past frame as a candidate of the color of the background.

5. The parcel recognition device of claim 1,
wherein the processor further receives a designation of a candidate of a color of a background, and switches the color of the background within a range of the received candidate.

6. The parcel recognition device of claim 1, the processor estimates the region of the one or more parcels in the color image, by using a distance image.

7. A parcel sorting system comprising:
a projection instruction device including the parcel recognition device according to claim 1;
a label reader that reads parcel identification information from a label attached to the parcel;
a distance image sensor that obtains a distance image including the parcel;
a color image sensor that obtains a color image including the parcel; and
an image projection device which projects a projection image indicating a sorting destination on parcel.

8. A parcel recognition method of recognizing parcel based on a color image including one or more parcels on a conveyor, the method comprising:
by causing a processor to cooperate with a memory,
estimating a region of the one or more parcels in the color image;
switching a color of a background in the color image, the background being a region including a region of the conveyor in the color image and excluding the estimated region of the one or more parcels in the color image; and
recognizing each of the one or more parcels based on the color image after the color of the background is switched.

9. The parcel recognition device according to claim 1, wherein the one or more parcels including a parcel having a color similar to a color of the conveyor.

10. The parcel recognition device according to claim 3, wherein the period is shortened when the recognition accuracy decreases.

11. The parcel recognition device according to claim 4, wherein
the processor detects the color of the parcel successfully recognized in the past frame; and
the processor excludes the detected color of parcel from the candidate of the color of the background in a current frame.

* * * * *